March 21, 1939. H. SCHARLAU 2,151,336
RADIO SIGNALING APPARATUS
Filed July 5, 1935
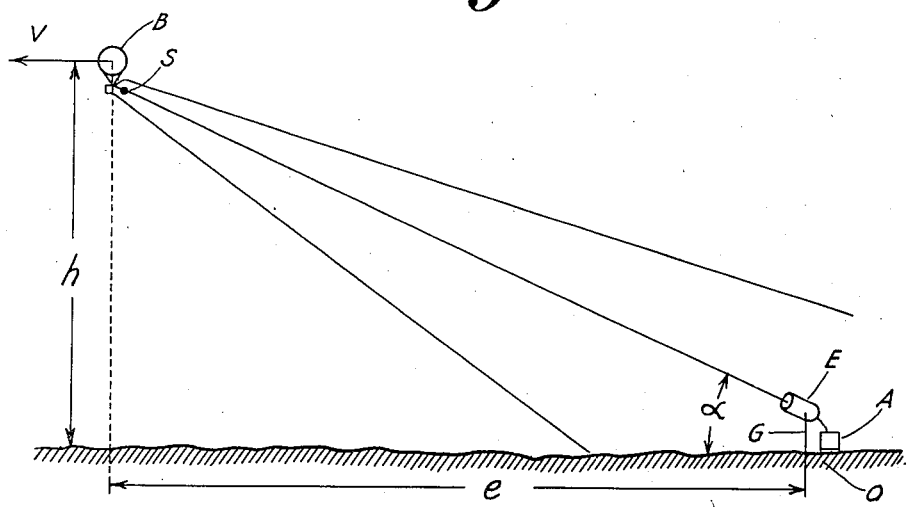
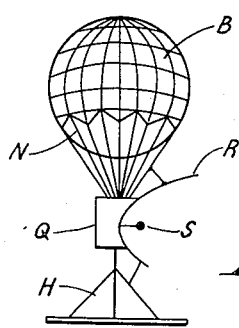
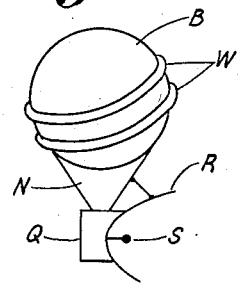
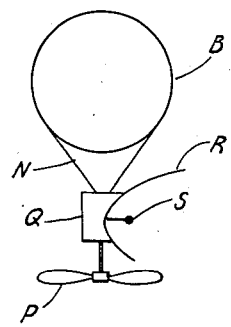
INVENTOR
HANS SCHARLAU
BY
ATTORNEY Patented Mar. 21, 1939

2,151,336

UNITED STATES PATENT OFFICE 2,151,336

RADIO SIGNALING APPARATUS

Hans Scharlau, Berlin, Germany, assignor to Telefunken Gesellschaft für Drahtlose Telegraphie m. b. H., Berlin, Germany, a corporation of Germany Application July 5, 1935, Serial No. 30,035 In Germany July 5, 1934

12 Claims. (Cl. 250—11)

This invention relates to improvements in radio transmission and reception apparatus and has particularly to do with the use of such apparatus for observing meteorological conditions and for obtaining reports of instrument measurements when the instruments are carried aloft as by free-floating balloons so that the observed data may be made immediately available on the ground.

In meteorological research work unmanned balloons have been used in the past, and they have been arranged to carry aloft various meteorological instruments such as the barometer, thermometer, etc. Thus, readings of these instruments may be obtained as the balloon ascends to different altitudes. The observed data can be transmitted by radio signals to a stationary receiving station located on the ground. When long wave transmitters were used in such work it was found that the antenna efficiency was very low due to the fact that an antenna of suitable proportions, to be efficient at the operating wave length, would be too heavy for practical use. I have found, therefore, that considerable improvement in the operating characteristics of such a system may be had by using ultra-short waves, that is, waves in the decimeter range. I have found also that by suitably designing the antenna system for an ultra-short wave transmitter, it becomes possible to obtain a variety of different observations of meteorological conditions, including determinations of the direction and velocity of the wind at different altitudes.

With a view to insuring satisfactory efficiency, it has been suggested to use short waves, say between 30 and 10 meters. However, in practice it has been found that these short waves are particularly subject to reflection from the Heaviside layer. To be sure, there is a useful method for short waves by the aid of the Adcock antenna in which the reflected radiation component which would produce erroneous bearings is rendered harmless. This method is not well suited to the use of "radio probes" inasmuch as the direct radiation must of necessity be brought in at a rather steep angle at the place where the readings are taken.

Another drawback in the use of long waves and medium-short waves (30–10 meters) is that the reflection from the ground vitiates the measuring results in most instances. Space probing by the aid of reflectors at the receiving end cannot be considered for practical reasons of space and weight. In fact, extensive structures would be required therefor, and these are out of the question for practical use in non-stationary equipment, such as required for expeditions, military uses and in weather reporting service.

Now, the present invention employs ultra-short waves which are arranged so as to insure marked concentration of the radiations at the receiving point and optionally also at the sending end. Relatively great ranges are thus obtainable with a minimum amount of energy. My improved system permits of probing or taking readings from the pilot balloon in an accurate way. From the angle of elevation and the known climb per unit of time, as will be seen, it has been made feasible for the first time, from a single observation point on the ground, to accurately ascertain the velocity of wind in different altitude zones. In fact, this method appears destined to entirely dispense with expensive kite flying in weather reporting work, in the army, and in navigation, seeing that the equipment here disclosed may be used independently of weather conditions, also at night-time, on the high seas, etc.

The present invention, looked at from its economic angles, its usefulness, and its low weight, has a great many merits. The transmitter of such a piloting balloon, because of the battery problem, is to be furnished with miniature size tubes, say, the so-called button or acorn tubes, which, with comparatively low voltages, allow of generating decimeter waves. The antenna structures should be specifically and absolutely low in weight and be braced and reinforced mechanically by parts of the balloon or else by being enveloped or sewed into suitable material. With the piloting balloon it is desirable to employ radio reflectors consisting of metal-sprayed fabrics or paper, it is also especially desirable to cover such parts of the balloon net, or hull, or bag with a reflective metallic coat. In order that the concentrated radiation or the beam may be directed, as far as feasible, in the direction of the observer, suitable means are provided by fastening to the balloon a bar magnet which, under the influence of the magnetic field of the earth, would adjust the radiator system in a predeterminable direction. But if the balloon is to be observed from various points, and if in spite of that the advantages of radiation concentration is to be utilized, then suitable means must be mounted on or under the balloon which, by action of the ascending power (buoyancy) occasion rotation of the system about a vertical axis. This is made possible by the aid of a vane or propeller which is fixedly disposed under the radiator system. Of course, ways and means must be adopted so as to prevent the propeller acting upon the path of the radiations. Steady turns of the radiator system could be accomplished also by providing a spiral configuration presenting a helical surface made of specifically light and weather-proof material located on the balloon proper.

At the receiving end, satisfactory taking of readings from the balloon must be provided in order that the angle of elevation may be exactly determined. Stray radiations forming a small angle to the radiator, such as are due to reflections from earth or from certain layers of altitude are excluded by employing very short waves and by the use of reflecting mirrors. For an exact determination of the angle of elevation it is recommended that recourse be had to directional receiving arrangements presenting a marked solid angle in the characteristic or a so-called beam of radiations. Therefore it is desirable to use a paraboloid of rotation or a multiple dipole arrangement (beam) which may be mounted upon a sort of telescope tripod or stand and which may be furnished with a level and a compass. The other receiver means that are required may be mounted separately. In addition, ways and means may be provided whereby the incoming beam may be turned a definite angle (which may be adjusted at will) about an axis presenting an angle of inclination to the direction of maximum volume. From the changes in receiving response during such rotation it will then be feasible to draw conclusions respecting the direction of the object to be observed. If, during the rotation, reception experiences no change, this implies that the direction of the axis of rotation coincides with the sense of the line between observer and object.

A number of embodiments of the arrangement of this invention are shown by the drawing in which Fig. 1 is a diagram of a pilot balloon transmitter and receiving point; Fig. 2 is an elevation of a pilot balloon having a reflector and a magnet attached thereto; Fig. 3 is an elevation of a pilot balloon having a reflector and a spiral configuration; and Fig. 4 is an elevation of a pilot balloon having a propeller attached thereto.

Referring now in detail to the drawing, Fig. 1 shows schematically means to determine the velocity of wind. A balloon B equipped with a short wave beam transmitter having attached thereto a radiator S, by virtue of its ascending powers, has reached an altitude $h$, and the assumption shall be made that because of a wind having a velocity $v$, the balloon has drifted from the ascending point O a distance of $e$ meters in horizontal sense. At the ascending place O is mounted a directional receiver E upon a pivotal stand G. The equipment required for observation and for reception is accommodated inside a portable box A. The observer is able to draw inferences regarding the distance $e$ from the altitude of rise $h$ which is proportional to the climbing time, and the angle of elevation $\alpha$, and thus regarding the velocity of the wind.

In the case shown in Fig. 2, a free floating balloon B carries with a net or lace N an ultrashort wave beam transmitter system, the net being of a metallic sprayed fabric. Inside a casing Q are the radio-frequency generators and batteries for supplying the working-voltage sources. Radiation is effected by means of a radiator S into the direction determined by reflector R both of which are secured to casing Q. It is desirable that the reflector R be constructed of paper or other light weight fabric having a metallic coat. On the lower portion of casing Q an adjustable supporting device H is secured. This device H is in the form of a bar-shaped permanent or electrically energized magnet M which, subject to the action of the earth magnetic field, turns the radiator or the whole system in a definite direction.

In the following Figs. 3 and 4, like reference letters, refer to similar elements.

In Fig. 3 is shown a balloon whose shell or network has a helical spiral W made from specifically light and weather-proof material. The spiral is arranged on the balloon surface in such a manner that rotation of the balloon with respect to the receiving point E will be effected when the balloon is floating in the atmosphere.

In the case of Fig. 4, a vane P is arranged below a balloon, by being secured to casing Q, the said vane by action of the driving force is intended to turn the whole system in a plane at right angles to the direction of movement.

The use of the idea underlying the invention is by no means confined to the exemplified embodiments here shown. For instance, battery, radio-frequency oscillator and radiator, whenever this would seem necessary, may be accommodated inside the bag of the balloon or in the net thereof. It goes without saying that the balloon may be equipped in addition with several measuring instruments and photographic equipment. Inasmuch as these balloons rise to spheres of extreme cold, it is indispensable that all elements and parts sensitive to temperature action should be made cold- and weather-proof, or else provision should be made to heat some of them, if this is necessary.

Having thus described my invention, what I claim is:

1. A system for short wave transmission of radio signals from an unmanned free floating balloon, said system comprising a balloon, a radio beam transmitter secured to said balloon, a reflector attached to said transmitter, and means mounted on said balloon for maintaining a desired orientation of said transmitter.

2. A system for short wave transmission of radio signals from an unmanned free floating balloon, said system comprising a balloon, a radio beam transmitter secured to said balloon, a reflector attached to said transmitter, and magnetic means carried by said balloon for maintaining a desired orientation of said transmitter.

3. A system for short wave transmission of radio signals from an unmanned free floating balloon, said system comprising a balloon, a radio beam transmitter secured to said balloon, a reflector attached to said transmitter, and magnetic means carried by said balloon for maintaining a desired orientation of said transmitter, said magnetic means comprising an adjustable magnet bar secured to the lower portion of said balloon.

4. A system for short wave transmission of radio signals from an unmanned free floating balloon, said system comprising a balloon, a casing secured to said balloon, a radio beam transmitter secured to said casing, a reflector attached to said transmitter, means adapted on said balloon to maintain a desired direction of radiation.

5. A system for short wave transmission of radio signals from an unmanned free floating balloon, said system comprising a balloon, a casing secured to said balloon, a radio beam transmitter secured to said casing, a reflector attached to said transmitter, and propeller means on said balloon and adapted to rotate the directional axis of radiation.

6. A system for short wave transmission of radio signals from an unmanned free floating balloon, said system comprising a balloon, a casing secured to said balloon, a radio beam transmitter secured to said casing, a reflector attached to said transmitter, and means carried by said balloon for causing the directional axis of said beam transmitter to be rotated as the balloon ascends.

7. A system for short wave transmission of radio signals from an unmanned free floating balloon, said system comprising a balloon, said balloon having a metallic reflecting coat, a casing secured to said balloon, a radio beam transmitter secured to said casing, a reflector attached to said transmitter, means adapted on said balloon to maintain a desired direction of radiation.

8. A system for short wave transmission of radio signals from an unmanned free floating balloon, said system comprising a balloon, said balloon having a metallic reflecting coat, a casing secured to said balloon, a radio beam transmitter secured to said casing, a reflector attached to said transmitter, said reflector comprising a metallic sprayed fabric, means adapted on said balloon to maintain a desired direction of radiation.

9. In a system for observing meteorological conditions, a free balloon, an ultra-short wave radio transmitter carried by said balloon and having a directive antenna, means carried by said free balloon for controlling the orientation of the directive axis of said antenna along inclined paths, stationary receiving apparatus responsive to signals emitted by said transmitter, and means for characterizing said signals thereby to convey to said receiving apparatus matters of fact in respect to said meteorological conditions.

10. A system in accordance with claim 9 in which the orienting means include vanes attached to said balloon for producing rotation thereof as the balloon ascends.

11. A system in accordance with claim 9 in which the orienting means include propeller means for producing rotation of said directive antenna as the balloon ascends.

12. A system in accordance with claim 9 in which said orienting means is responsive to the earth's magnetism for maintaining a fixed orientation of said directive antenna.

HANS SCHARLAU.